United States Patent Office 3,746,659
Patented July 17, 1973

3,746,659
FLUID CRACKING CATALYST AND
PREPARATION THEREOF
John P. Horzepa, Edison, N.J., assignor to Engelhard
Minerals & Chemicals Corporation, Woodbridge, N.J.
No Drawing. Filed June 25, 1971, Ser. No. 157,007
Int. Cl. B01j 11/44, 11/40
U.S. Cl. 252—448                      6 Claims

ABSTRACT OF THE DISCLOSURE

An aluminum silicate catalyst suitable for cracking hydrocarbons or as a carrier for catalytic materials is prepared by spray drying kaolin clay to form microspheres, calcining the microspheres at about 1350° F., immersing the calcined microspheres in water to form a slurry, heating the slurry under superatmospheric pressure and removing water from the microspheres.

BACKGROUND OF THE INVENTION

Kaolin clay is a naturally-occurring mineral material composed for the most part of kaolinite or similar platy crystalline minerals of the approximate formula $$Al_2O_3 \cdot 2SiO_2 \cdot 2H_2O$$

Even in highly pure form the clay does not possess sufficient activity for use as a cracking catalyst and it is not sufficiently porous for use as a catalyst carrier. Reference is made to relevant data in U.S. 2,967,157 to Robinson and Weir. Calcination to remove water of crystallization does not impart the required properties to such clay.

Prior to my invention it has been considered necessary to employ an acid treatment of one type or another in order to impart sufficient catalytic activity to kaolin clay.

A commercially successful method for activating kaolin clay involves an acid-activation step using sulfuric acid. The general method is described in U.S. 2,967,157 (supra). A preferred embodiment for providing pelleted catalysts is set forth in U.S. 3,033,798 to Weir and Robinson. U.S. 3,039,973 to Robinson and Haden describes the preparation of microspheres for use in fluid bed cracking operations by modification of the method set forth in U.S. 2,967,157.

Acid-activated kaolin catalyst obtained by the procedures described in the aforementioned patents possess satisfactory cracking properties which are retained to a satisfactory degree after the catalysts are subjected to elevated temperatures. The catalysts have outstanding hardness (resistance to attrition) but they tend to become less resistant to attrition after they have been subjected to high temperature air or steam during regeneration and/or use.

U.S. 2,477,664 to Shabaker is also concerned with the activation of kaolin clay and teaches that kaolin catalysts which retain their activity when subjected to steam at high temperature may be obtained by subjecting calcined kaolin clay to the action of high pressure steam before using the catalyst in a cracking unit. This patent discloses that catalysts of optimum activity retained upon steaming require an acid treatment which may be carried out prior to calcination and steaming or subsequent to calcination and steaming. The patent includes catalytic cracking data for a pelleted catalyst obtained by calcining extruded pellets of raw (hydrated) kaolin clay, steaming for 10 hours at 450° F. at a pressure of 500 p.s.i. and activating in air at 1050° F. without any acid treatment. The data show that the pellets were not appreciably more active than pellets of the clay which had merely been calcined without undergoing high temperature steaming.

THE INVENTION

I have discovered a method for activating a kaolin clay which does not entail an acid activation step and which leads to the provision of fluid cracking catalyst particles having catalytic properties comparable to those of commercial acid-activated kaolin clay catalyst without the defect of losing hardness as a result of being subjected to high temperatures.

Stated briefly, the method of the present invention comprises the steps of forming an aqueous slurry of hydrated kaolin clay, spraying the slurry in hot air to form microspheres, calcining the microspheres in air using calcination conditions which dehydrate the clay and convert it into metakaolin (defined hereinafter), slurrying the microspheres in water, heating the slurry under superatmospheric pressure, and terminating the high pressure steam treatment after the metakaolin is partially rehydrated and before the microspheres begin to soften appreciably.

From this brief description of my invention it will be readily apparent that the method of the present invention encompasses a departure from the prior art practice of using an acid to activate kaolin clay. The method of the invention differs in several critical respects from the method of Shabaker U.S. Pat. 2,477,664. Firstly, an essential feature of my method resides in the initial step of forming the hydrated clay into microspheres by employing a spray drying operation. I have carried out numerous unsuccessful tests in attempts to substitute this step for the step of extruding hydrated kaolin clay to form pellets, as suggested in the Shabaker et al. patent. The catalysts obtained by calcining such pellets and rehydrating them under conditions which led to outstanding results when microspheres were employed resulted in pellets of unacceptable catalytic cracking activity. Secondly, when subjecting the particles of calcined clay to high pressure steam, I control the duration of the hydrothermal treatment under pressure.

DESCRIPTION

The term "kaolin clay" as used herein refers to clay containing one of the following minerals as the predominating mineral species: kaolinite, nacrite, dickite, anauxite, halloysite. These minerals may be represented by the formula $Al_2O_3 \cdot 2SiO_2 \cdot XH_2O$ wherein X is 2 except in the case of certain halloysites, in which case X is 4. A high purity of kaolin clay is preferred. Such clay should be low in iron, i.e., it should analyze less than 1% $Fe_2O_3$.

I prefer to degrit the raw clay as mined by removing plus 325 mesh matter and to eliminate a substantial proportion of the plus 2 micron (e.s.d.) particles by conventional wet classification means. A fine size fraction of degritted Georgia kaolin having an average particle size below about 1 micron is recommended.

To produce microspheres of hydrated (uncalcined) kaolin clay I prepare an aqueous slurry containing about 50 percent to 65 percent clay solids (wt. basis), preferably above 55 percent solids. To obtain a slurry of such concentration, a small amount of a clay dispersant is incorporated with the clay and water. The use of a sodium condensed phosphate salt in amount within the range of about 0.2 percent to 0.5 percent of the dry weight of the clay is suggested.

The slurry is spray dried in an apparatus capable of producing microspheres of suitable particle size, e.g., particles substantially all finer than 20 mesh (Tyler) or larger than 20 microns. The atmosphere in the spray dryer is heated air. In a typical operation the spray dried microspheres have a bulk density of about 0.88±0.02 g./cc. before they are calcined. These microspheres possess sufficient hardness to be handled in conventional calciners without excessive breakdown which would result in loss of clay.

Using a cocurrent dryer, air inlet temperature up to 1200° F. may be used when the clay feed is charged at a rate sufficient to produce an air outlet temperature within the range of 250° F. to 600° F. At these temperatures, free moisture is removed from the slurry without removing water of hydration (water of crystallization) from the clay. Controlled dehydration of some of the raw clay during spray drying is, however, within the scope of the invention.

The microspheres thus obtained are calcined in air at a temperature within the range of about 940° F. to 1650° F. for a time sufficient to convert the kaolin clay in the microspheres into metakaolin (defined in U.S. 3,224,892 to Hemstock and Bergmann). The time required depends upon the temperature that is employed and is usually within the range of ½ hour to 20 hours. A calcination temperature of 1350° F. and a time within the range of 4 to 10 hours is especially recommended.

Before high pressure steaming, the microspheres are essentially anhydrous (i.e., they analyze less than 1 percent L.O.I.). The term "L.O.I" as used herein refers to loss on ignition and is determined by heating the microspheres to constant weight of 1800° F., the microspheres having previously been dried to constant weight at 225° F. to eliminate so-called "free moisture". provided calcination is well-controlled and uniform, the particles should be essentially noncrystalline (as determined by X-ray diffraction). Kaolinite peaks may be present in any undercalcined microspheres and high temperature crystalline phases may be present in any overcalcined portions.

The microspheres, or a desired size fraction thereof, is slurried in water to produce a suspension which is preferably sufficiently dilute to be fluid, e.g., a slurry containing 5 percent to 25 percent solids.

The slurry is placed in an autoclave or other equipment serving a similar function.

The microspheres should be steamed at high pressure until they have a B.E.T. surface area above 100 m.$^2$/g. Generally it will be necessary to rehydrate to a L.O.I. in excess of 7.0 percent to achieve this result. However, when portions of the microspheres have been overcalcined or undercalcined, the L.O.I. may be lower than this figure. Excessive rehydration is to be avoided. When the microspheres are steamed under superatmospheric pressure for long a time, they tend to soften. This softening may be attributable to recrystallization (or incipient recrystallization) of kaolinite (or other kaolin mineral). Thus, when the duration of hydrothermal is sufficient to provide microspheres having a L.O.I. above 12.5 percent, the microspheres may lack the desired hardness.

Saturated steam at pressures within the range of about 200 to 1000 p.s.i.g. may be used.

As pressure increases the duration of hydrothermal treatment will decrease. However, more expensive equipment may be required. A pressure of about 500 p.s.i.g. is suitable since hydrothermal treatment is sufficiently short (e.g. 4 hours in a batch operation) and expenses involved in dealing with higher pressures are avoided.

After hydrothermal treatment, the slurry of microspheres is cooled and water is removed by filtration and/or drying.

At this point of the process the microspheres have essentially the same chemical analysis of the starting clay with the exception that the L.O.I. is lower. Thus the L.O.I. of kaolin clay is normally within the range of about 13.5 percent to 14.0 percent whereas the microspheres usually have an L.O.I. above 7 percent and below 12.5 percent after high pressure steam treatment.

These microspheres may be used in hydrated form in a cracking unit to crack gas-oil feedstock. Preferably the steamed microspheres are subjected to a heat treatment before they are used in a cracking unit. This heat treatment may be carried out in air and/or steam at a temperature above the temperature encountered in a cracking unit. A calcination and/or steam treatment within the range of 1000° F. to 1500° F. is recommended.

It is within the scope of the invention to employ the microspheres as adsorptive carriers for other catalytic material. For example, the microspheres may be impregnated with a salt containing a volatile anion and a cation which forms a nonvolatile oxide having catalytic properties, e.g., copper nitrate, which is used to prepare a supported copper oxide catalyst. The impregnated microspheres are calcined to decompose such salt, leaving the desired metallic oxide adsorbed in the microspheres. In similar manner, the spheres may be impregnated with a solution of salt or other compound capable of decomposing in a reducing atmosphere to leave a metallic residue.

The "CAT-D" test used in the examples which follow is described by Clifford A. Harriz in "To Test Catalytic Cracking Activity," Hydrocarbon Processing, October 1966, vol. 45, No. 10, pages 183 to 188. Cracking was carried out at 900° F. with 10 percent steam and a liquid hourly space rate of 4.0 (ml. oil)/(cc. catalyst) (per hour) for a 15 minute operation period.

The term "kaolin coke factor" used in presenting catalytic data refers to a value obtained by comparing coke made of the experimental catalyst with that of a commercial kaolin catalyst at the same conversion (extrapolated).

Attrition resistance of 200/270 mesh fractions of microspheres were measured by the procedure described in U.S. 3,503,900 to Haden and Dzierzanowski, column 11, line 53 to column 12, line 5. An attrition rate below 1.5 percent/second, preferably below 1.0 percent/second, was desired.

A Georgia kaolin crude mined near McIntyre, Georgia was used as the starting material.

After being dried to constant weight at 225° F., a typical sample of the degritted clay analyzes (wt. basis) 13.8 percent L.O.I. (principally $H_2O$), 45.4 percent $SiO_2$, 38.8 percent $Al_2O_3$, 1.5 percent $TiO_2$, 0.3 percent $Fe_2O_3$, 0.1 percent $Na_2O$, 0.1 percent $CaO$. The clay is well crystallized (as evidenced by the fact that an X-ray pattern exhibits sharp peaks diagnostic for kaolinite).

The crude was plunged in water, degritted to remove plus 325 mesh solids, dispersed at about 20 percent solids with sodium silicate solution and centrifuged. A fine size fraction, 78 to 82 percent finer than 2 microns, was obtained as an overflow product. This product was thickened by adding sulfuric acid and removing supernatant from the clay flocs. The thickened pulp was bleached with zinc hydrosulfite, filtered and washed. A deflocculant (tetrasodium pyrophosphate) was added to the filter cake in amount of about 0.3 percent of the moisture-free clay weight along with water to bring up the solids to 58.3 percent.

The slurry was dried in hot air in a Niro spray dryer, a cocurrent type of dryer provided with a spray wheel to disperse the slurry into droplets and a cyclone to elutriate fines from the chamber of the dryer. Air inlet and outlet temperatures were 608° F. and 226° F., respectively. The wheel was operated at a speed of 15,000 r.p.m. The weight ratio of chamber product to cyclone product (fines) was about 5.5/1.

The microspheres in the chamber product had a bulk density of 0.89 g./cc. Particle size was 0.1 percent (wt.) +100 mesh, 16.8 percent 100/200 mesh; 46.5 percent 200/325 mesh and 36.6 percent minus 325 mesh.

The spray dried microspheres were calcined at 1350° F. for 4 hours.

The calcined microspheres had a bulk density of 0.94 g./cc. Particle size was 0.1 percent (wt.) plus 100 mesh (Tyler); 10.2 percent 100/200 mesh; 47.9 percent 200/325 mesh; 41.8 percent minus 325 mesh.

A 7 pound charge of the calcined microspheres was mixed with 28 pounds of deionized water. The resulting slurry was placed in a 5 gallon capacity autoclave which was provided with electrical heating means and an agitator operted at a speed sufficient to maintain the microspheres in suspension. The heating unit was turned on and in about 4 hours a temperature of about 470° F. and a pressure of about 500 p.s.i.g. was attained (saturated steam). The temperature and pressure were maintained at these values for 2 hours. The procedure was repeated, maintaining the slurry under a saturated steam pressure of 500 p.s.i.g. for 4 hours after such pressure had been developed. In a third test, pressure was maintained at 500 p.s.i.g. for 6 hours. The three slurries were separately dewatered by filtration and the filter cakes were then dried in air at 250° F. The L.O.I. of the three batches of microspheres was determined in order to ascertain the extent of rehydration which occurred after the steam treatment for 2, 4 and 6 hours with saturated steam at 500 p.s.i.g. The results are summarized in Table I.

L.O.I. data in Table I show that the chemically held water contents of the microspheres increased with increasing steaming time. Thus, L.O.I. was 7.0 percent after 2 hours, 11.5 percent after 4 hours and 12.6 percent after 6 hours. Even after 6 hours the microspheres contained less than the 13.8 percent L.O.I. of the starting clay.

Portions of the dried (250° F.) microspheres were calcined in a muffle furnace at 1100° F. for one hour. Other portions were calcined in the furnace at 1500° F. for one hour. The hardnesses of microspheres before and after the calcination treatments were measured in order to determine whether heat treatment at elevated temperatures would be detrimental to hardness. Bulk densities were also measured since this property is related to attrition resistance.

The results of the hardness tests are summarized in Table I along with L.O.I. data and bulk densities to correlate these factors.

TABLE I.—EFFECT OF REHYDRATION CONDITIONS UPON HARDNESS OF PARTIALLY REHYDRATED METAKAOLIN FLUID CATALYSTS

| Sample: | | | |
|---|---|---|---|
| Hydrothermal conditions, 500 p.s.i.g./470° F./hr | 2 | 4 | 6 |
| L.O.I. | 7.0 | 11.5 | 12.6 |
| Heat treatments: | Properties of microspheres after heat treatments | | |
| Oven dried at 250° F. only: | | | |
| Percent/sec.[1] | 1.80 | 0.75 | 4.0 |
| G./cc.[2] | 0.82 | 0.86 | 0.84 |
| Calcined 1,100° F./1 hr.: | | | |
| Percent/sec.[1] | 1.50 | 0.55 | 3.2 |
| G./cc.[2] | 0.81 | 0.83 | 0.75 |
| Calcined 1,500° F./1 hr.: | | | |
| Percent/sec.[1] | 1.40 | 0.35 | 1.60 |
| G./cc.[2] | 0.83 | 0.84 | 0.82 |

[1] Attrition rate.
[2] Bulk density (tamped).

Data in Table I show that dried, uncalcined partially rehydrated microspheres containing 11.5 percent L.O.I. were appreciably harder than and somewhat more dense than microspheres rehydrated to 7.0 percent and 12.6 percent L.O.I. Microspheres rehydrated to 7.0 percent L.O.I. were harder than microspheres rehydrated to 12.6 percent L.O.I. Only the microspheres rehydrated to 11.5 percent water of crystallization had an attrition rate below the desired maximum value of 1.5 percent/second.

Heat treatments at 1100° F. and 1500° F. improved the hardness of all of the microspheres.

A portion of each batch of dried (250° F.) microspheres was calcined in a muffle furnace at 1350° F. for 4 hours. The activity and selectivity of the activated products as hydrocarbon cracking catalysts were determined by the CAT-D method. To place the microspheres in a form amenable to testing in the CAT-D test unit, they were pelletized in a press and the pellets were broken up into chips (about +20 mesh) before carrying out the catalytic testing.

To evaluate the steam stability of the catalysts, a portion of the microspheres was steamed at 1500° F. for 4 hours and the steamed microspheres were tested by the CAT-D procedure.

Surface areas of the microspheres were measured by the B.E.T. method (U.S. 3,224,892, supra) after the microspheres had been calcined at 1350° F. for 4 hours in order to study the effect of duration of hydrothermal treatment on this property and to correlate catalytic activity with surface area of the activated catalysts.

Results for the test procedures described above are reported in Table II.

TABLE II.—EFFECT OF REHYDRATION CONDITIONS ON PROPERTIES OF PARTIALLY REHYDRATED METAKAOLIN FLUID CATALYSTS

| Sample: | Experimental catalysts | | |
|---|---|---|---|
| Hydrothermal conditions, 500 p.s.i.g./480° F./hr | 2 | 4 | 6 |
| L.O.I. (before calcination) | 7.0 | 11.5 | 12.6 |
| Surface area, m.²/g. (after calcination 1,350° F./4 hr.) | 54.7 | 110.8 | |
| "CAT-D" properties (after calcination 1,350° F./4 hr.): | | | |
| Gasoline, vol. percent | 37.5 | 40.2 | 40.3 |
| Gasoline, wt. percent | 30.9 | 32.6 | 33.3 |
| Coke, wt. percent | 3.1 | 5.8 | 6.6 |
| Gas, wt. percent | 14.9 | 23.9 | 25.9 |
| Conversion, wt. percent | 48.9 | 62.3 | 65.8 |
| Gas gravity (air=1.0) | 1.40 | 1.48 | 1.51 |
| Kaolin coke factor | 1.08 | 1.05 | 1.00 |
| Cracking efficiency, wt./wt. | 63.2 | 52.3 | 50.6 |
| "CAT-D" properties (after steaming 1,500° F./4 hr.): | | | |
| Gasoline, vol. percent | 33.3 | 40.3 | 41.8 |
| Gasoline, wt. percent | 27.6 | 33.2 | 34.1 |
| Coke, wt. percent | 1.3 | 2.5 | 2.5 |
| Gas, wt. percent | 7.0 | 13.2 | 13.5 |
| Conversion, wt. percent | 25.9 | 48.9 | 50.2 |
| Gas gravity (air=1.0) | 1.31 | 1.44 | 1.49 |
| Kaolin coke factor | 0.84 | 0.87 | 0.82 |
| Cracking efficiency, wt./wt. | 76.9 | 67.9 | 67.9 |

Data in Table II indicate that the surface area of the microspheres increased with increase in the duration of the rehydration treatment. Catalytic data for the three samples (unsteamed) show that all were highly selective (minimum of 37.5 percent (vol.) gasoline and active (minimum 48.9 percent (wt.) conversion). Products rehydrated to L.O.I. values of 11.5 percent and 12.6 percent were more selective and more active than the product rehydrated to a L.O.I. of 7.0 percent.

Data in Table II show that after high temperature steaming, the microspheres rehydrated to 7 percent L.O.I. were less active and less selective than they were prior to steaming. In contrast, the microspheres rehydrated to 11.5 percent and 12.6 percent (L.O.I.) retained their selectivity while decreasing moderately in activity (conversion). After steaming, these catalysts were as active as the catalyst rehydrated to 7 percent L.O.I. was before steaming and operated at about the same conversion level.

The CAT-D properties set forth in Table II were then compared to those for a commercial acid-activated kaolin clay ("HM 170") after the commercial catalyst had been stabilized by calcination in air at 1050° F. for one hour. The commercial catalyst was obtained by the procedures described in U.S. 3,033,798 (supra). Typical properties of this catalyst (after steaming at 1550° F.) are as follows:

Gasoline, vol. percent _____ 36.8
Gasoline, wt. percent _____ 30.3
Coke, wt. percent _____ 4.1
Gas, wt. percent _____ 18.7
Conversion, wt. percent _____ 53.1
Gas gravity _____ 1.45
Kaolin coke factor _____ 1.16
Cracking efficiency, wt./wt. _____ 57.1

A comparison of catalytic data in Table II for experimental partially rehydrated metakaolin catalysts with these data show that microspheres rehydrated to 11.5 percent to 12.6 percent L.O.I. had catalytic properties similar to that of the commercial acid-activated clay. The latter was slightly less active and operated at a lower conversion level, producing more coke than the experimental catalysts.

Correlation of data in Tables I and II for the three experimental catalysts show that the sample rehydrated to 11.5 percent L.O.I. was the best catalyst when using both hardness and catalytic properties as the prime criteria. This catalyst was exceptionally hard before and after being subjected to elevated temperature and it was also highly selective to the production of gasoline and operated at a high conversion level before and after steaming.

These results therefore demonstrate that when subjecting a slurry of spray dried microspheres of metakaolin to high pressure steam, the steaming time should be sufficiently long to impart adequate activity and selectivity, functions which may be correlated with surface area, but that excessive steaming (rehydration) has an adverse effect upon hardness. These factors must be counterbalanced in order to produce a fluid catalyst having the desired combination of properties.

I claim:

1. A method for making a fluid cracking catalyst which consists essentially of: forming a fluid aqueous slurry of kaolin clay, spraying said slurry into hot inert gas to form microspheres, calcining said microspheres at a temperature and for a time sufficient to convert the kaolin clay into metakaolin, slurrying the calcined microspheres in water, heating the resulting slurry at elevated temperature under superatmospheric pressure until partial hydration of the metakaolin takes place, terminating the heating before the microspheres soften and removing water from the microspheres.

2. The method of claim 1 wherein the B.E.T. surface area of the microspheres is above 100 m.$^2$/g. when the heating of said slurry is terminated.

3. The method of claim 1 wherein the heating of the slurry of calcined microspheres is terminated before the microspheres analyze in excess of 12.5 percent loss on ignition at 1800° F.

4. The method of claim 1 wherein the slurry of calcined microspheres is terminated when the loss on ignition analysis of the microspheres is within the range of 7.0 percent to 12.5 percent.

5. The method of claim 1 wherein the slurry of calcined microspheres is heated with saturated steam at a pressure of about 500 p.s.i.g. for about 4 hours.

6. A fluid cracking catalyst obtained by the method of claim 1.

References Cited
UNITED STATES PATENTS

| | | | |
|---|---|---|---|
| 3,226,252 | 12/1965 | Hemstock | 252—450 X |
| 3,039,973 | 6/1962 | Robinson et al. | 252—450 |

CARL F. DEES, Primary Examiner

U.S. Cl. X.R.

252—455 R